United States Patent [19]
Takeda et al.

[11] 3,856,407
[45] Dec. 24, 1974

[54] AUTOMATIC FOCUSING DEVICE

[75] Inventors: Hideomi Takeda; Harumi Kawasaki, both of Tokyo, Japan

[73] Assignee: Asahi Kogaku Kogyo Kabushiki Kaisha, Tokyo-to, Japan

[22] Filed: Nov. 2, 1973

[21] Appl. No.: 412,457

[30] Foreign Application Priority Data
Nov. 14, 1972  Japan............................. 47-113992

[52] U.S. Cl.................. 356/123, 95/44 C, 250/201, 352/140
[51] Int. Cl............................. G01j 1/00, G03b 3/00
[58] Field of Search ............ 356/122, 123; 250/201; 95/44 C; 352/140

[56] References Cited
UNITED STATES PATENTS
3,450,018  6/1969  John, Jr. et al................. 352/140 X
3,781,110  12/1973  Leitz................... 250/201

*Primary Examiner*—James W. Lawrence
*Assistant Examiner*—T. N. Grigsby
*Attorney, Agent, or Firm*—Christie, Parker & Hale

[57] ABSTRACT

An image is formed on a plane by light passing through a lens. The lens and the plane are movable relative to each other so as to focus the image. A two-dimensional diffraction grating, preferably of the phase grating type, is disposed in the optical path at a distance spaced away from the plane. A photoelectric element, preferably a CdS cell exhibiting a dip effect, is disposed in the plane and provides an electrical signal used in a positioning mechanism that provides for maximizing the contrast of the image formed by the light passing through the diffraction grating and impinging on the photoelectric element so as to bring the image into focus.

6 Claims, 10 Drawing Figures

AUTOMATIC FOCUSING DEVICE

CROSS-REFERENCE TO RELATED APPLICATION

Application Ser. No. 403,534, filed Oct. 4, 1973 entitled AUTOMATIC FOCUS ADJUSTMENT MEANS, by Harumi Aoki and Takuo Itagaki, and assigned to the assignee of this invention is directed to an arrangement including a self-scan type photoelectric element. The disclosure of this application is hereby incorporated by reference herein.

BACKGROUND OF THE INVENTION

This invention relates to automatic focusing apparatus. Automatic focusing has already been achieved in the camera art. Generally, the spacing between an image-forming lens and the image plane is adjusted so as to maximize the degree of contrast in the image. This of course requires some means for sensing and indicating the degree of contrast.

A well-known approach involves the use of an image pickup tube of scanning of the image formed on the image plane. The image tube provides an electrical signal whose value depends upon whether the image is in or out of focus. With this approach, all the spatial frequency components contained in the image are detected. It is theoretically known, however, that the reduction in image contrast caused by defocusing an optical image increases in general at higher spacial frequencies. Furthermore, the image contrast is nothing but the OTF (Optical Transmission Function) of the associating optical system, and the reduction in the OTF caused by defocusing is spacial frequency dependent, being much larger at higher frequencies.

In another known approach, there is provided a semiconductor light sensitive element that exhibits a dip effect. That is, its electrical characteristics provide a local peak so as to identify an in-focus position. Adhered to the light sensitive element there is a grating-like mask. Typically the mask consists of a glass plate having non-transmissible parts arranged on it. This mask is of the amplitude type and provides merely a multiplication of the light intensity distributions in the optical image and the grating-like mask.

SUMMARY OF THE INVENTION

This invention provides a high-precision automatic focusing device through the use of a two-dimensional diffraction grating which serves as a high-pass filter.

In contrast to the approach whereby an image tube is used, the present invention provides for detection of the more significant high-frequency spatial frequency components of an image. In contrast to the approach whereby a grating-like mask is used, the present invention provides not merely a multiplication of intensity distributions but rather a true optical transmission function spatial frequency filter.

The apparatus of this invention includes means, including a lens, defining an optical path such that at least a portion of light passing through the lens impinges upon a plane. The lens and the plane are movable relative to each other in either of two opposite directions along the optical path. Preferably, the optical path is defined in part by a reflex mirror that reflects light at a right angle with respect to the optical axis of the lens.

A focusing control signal is produced by means of a photoelectric element responsive to light impinging on the plane. The control signal varies in accordance with the degree of contrast in the impinging light. The degree of contrast is maximum for an in-focus spacing between the lens and the plane.

Significantly, the apparatus includes an optical transmission function filter for increasing the difference between the degree of contrast obtained at an in-focus spacing and the degree of contrast obtained at an out-of-focus spacing. The filter comprises a diffraction grating, preferably of the phase grating type, disposed in the optical path and spaced from both the lens and the plane. Means responsive to the control signal provide for adjusting the spacing between the lens and the plane to a relative spacing that maximizes the degree of contrast.

According to the invention, the diffraction grating may be of any type selected from the group comprising phase grating, amplitude grating, and complex amplitude grating, with the phase grating type being preferred. The grating may be constructed of a thin glass disc and be spaced an arbitrary distance from the photosensitive element. Advantageously, the photosensitive element is a CdS cell of the type exhibiting a dip effect.

Features and advantages of a spatial frequency filter consist of a two-dimensional phase grating as follows:

i. Since it is a phase grating, then the insertion of the spatial frequency filter into the optical path results in no reduction in the quantity of the image forming light;

ii. The pass band width and the OTF of this filter are constant but not dependent on the numerical aperture (F-number) of the image forming lens; and iii. This filter may be located either at any position along the optical axis between the image forming lens and the image forming surface or in the pupil plane of the image forming lens.

DETAILED DESCRIPTION

General Description

Figure 1:
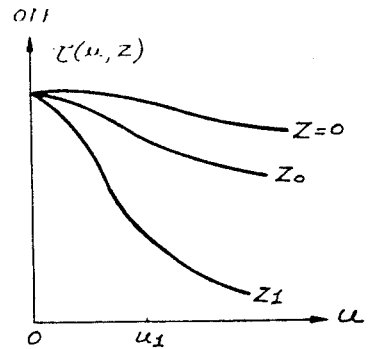
FIG. 1 is a graph plotting the OTF frequency characteristic of an ordinary image forming optical system with respect to three different defocusing values.
Figure 2:
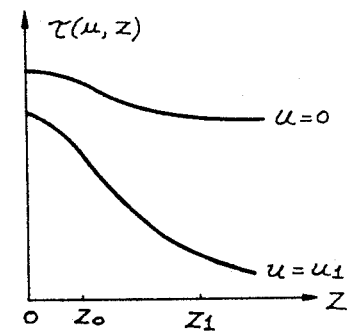
FIG. 2 is a graph plotting the OTF and defocusing value of an ordinary image forming optical system with respect to two different spatial frequencies.

Preliminarily, the relationship between the OTF of the image forming lens and the defocusing quantity will be stated briefly. FIG. 1 illustrates three OTF curves $\tau(u, z)$ at different defocusing values $z$ with respect to the spatial frequency $u$ taken as abscissa; and FIG. 2 illustrating two OTF curves $\tau(u, z)$ at different spatial frequencies ($u = o$ and $u = u_1$) with respect to the defocusing value $z$ taken as abscissa. With $z = 0$, the image is in focus; with $z = z_0$, the image is slightly out of focus; and with $z = z_1$, the image is substantially out of focus. As indicated in FIG. 1, the same OTF at $u = 0$ is obtained whether the image is in or out of focus. On the other hand, at all spatial frequency $u = u_1$, there is some reduction in the OTF as the spacing is changed toward substantial defocusing. And at even higher spatial frequencies, there is a greater reduction in the OTF for the same change in spacing toward substantial defocusing. Thus it will be seen from these Figures that the reduction in the OTF of the image forming system becomes remarkable as the defocusing value and frequency increase.

Figure 3:
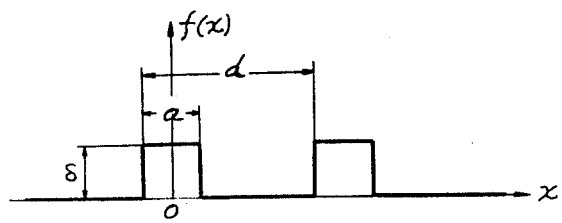
FIG. 3 is a plot illustrating the phase of a one-dimensional rectangular phase grating.

Now the OTF of the two-dimensional phase grating employed in this invention and its function as a band-pass filter will be explained. An understanding of this is facilitated by an explanation of a one-dimensional diffraction grating. A one-dimensional angular grating has a phase distribution as shown in FIG. 3, which is expressed by a function $f(x)$.

$$f(x) \begin{cases} \exp(i_\delta) & |x| \leq \frac{a}{2} \\ 1 & \frac{a}{2} \leq |x| \leq \frac{d}{2} \end{cases} \quad (1)$$

where $\delta$ is phase difference, $a$ tooth width and $d$ pitch of the grating.

The approximate value of the OTF $\tau_p(u)$ ($u$ is frequency) is obtained by a simple calculation, $$\tau_p(u) = q\left(\frac{a}{\lambda b}, u\right) * \sum_{p=-\infty}^{\infty} \delta\left(u - \frac{d}{\lambda b} p\right)$$

where, $q(B, u)$ is a function of a triangular wave having a base of $2B$ and a height of 1; $\delta[u - (d/\lambda b)P]$ represents impulses at the position of $u = (d/\lambda b) P$; the mark * represents a convolution; $b$ is the distance between the grating and the image forming surface (FIG. 6); and $\lambda$ is the wavelength of the light (normally $\lambda = 0.5u$).

The overall OTF $\tau_T(u, z)$ of the image forming system having a phase grating incorporated herein becomes $\tau_T(u, z) = \tau_p(u) \cdot \tau(u, z)$. Therefore, the power spectrum $P_s(u, z)$ of the object image formed on the image surface may be expressed by the production of the power spectrum contained in the image and the overall OTF $\tau_T(u, z)$.

Figure 4:
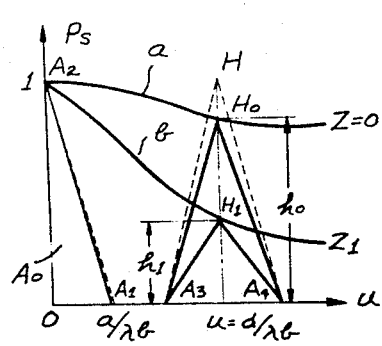
FIG. 4 is a graph illustrating the power spectrum of an object image formed by an ordinary image forming optical system and the band-pass filter effect of a phase grating.

The power spectrum $P_s(u, z)$ of the image is as shown in FIG. 4, wherein the OTF $\tau_p(u)$ of the phase grating itself is triangular wave functions $\Delta OA_1A_2$ and $\Delta A_3HA_4$ and curves $a$ and $b$ represent respectively the power spectrum of the image at the focusing position ($z = 0$) and a defocusing position ($z = z_1$), provided that no phase grating is inserted. When a phase grating is inserted into the image forming system the power spectrum $P_s(u, z)$ of the image becomes triangular wave functions $\Delta OA_1A_2$, $\Delta A_3H_0A_4$ and $\Delta A_3H_1A_4$, where $\Delta A_3H_0A_4$ and $\Delta A_3H_1A_4$ represent power spectra at the focusing position ($z = 0$) and a defocusing position ($z = z_1$) respectively and the area $A_0 = 2\Delta OA_1A_2$ can be regarded incidently as a direct current component of the optical image. It will now be understood that the phase grating of the square wave type acts as a bandpass filter for the OTF of the optical system or for the power spectrum of the image.

Figure 5:
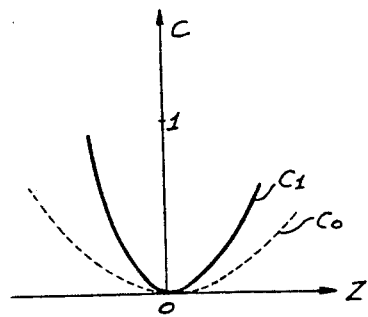
FIG. 5 is a graph plotting the variation in the optical image contrast taking the defocusing value as abscissa.

In FIG. 4 the areas $S_a = \square 0u_0H_0A_2$ and $S_b = \square 0u_0H_1A_2$ represent respectively the overall light fluxes detected at the focusing position ($z = 0$) and a defocusing position ($z = z_1$) when no grating is used; whereas the areas $S_0 = A_0 + \Delta A_3H_0A_4$ and $S_1 = A_0 + \Delta A_3H_1A_4$ are respectively the detected overall light fluxes at the focusing position and a defocusing position when the phase grating being inserted. Let us suppose now that the contrast change ratio of those overall light fluxes during defocusing are expressed as $C_0 = (S_a - S_b)/(S_a + S_b)$ and $C_1 = (S_0 - S_1)/(S_0 + S_1)$ respectively. In the Figure assuming that the heights $u_0H_0$ and $u_0H_1$ of the power spectrum at a frequency $u_0$ are $h_0$ and $hd 1$, respectively, the contrast change ratios will be $C_0 = (h_0 - h_1)/(2 + h_0 + h_1)$ and $C_1 = (h_0 - h_1)/(h_0 + h_1)$ respectively. As is apparent from FIG. 4 both of these contrast change ratios $C_0$ and $C_1$ increase with the increase in the spacial frequency and $C_1$ is always larger than $C_0$. When the frequency reaches near zero both $C_0$ and $C_1$ approach zero. Take a power spectrum where $h_1 \to 0$ (i.e., $h_1$ approaches zero) and $h_0 \to 1$, for example, it will be appreciated that $C_0 \to \frac{1}{3}$ and $C_1 \to 1$, improving the contrast change ratios by up to 3. FIG. 5 shows these contrast change ratios $C_0$ and $C_1$. It will be understood rom the foregoing that the reduction in contrast due to defocusing can be evaluated efficiently by use of a phase grating as a band-pass filter, and that a high-sensitivity detection of the image contrast can be achieved in this manner.

In the foregoing example which has been discussed in connection with a one-dimensional grating, the positive primary pass band alone (corresponding to $p = +1$ in Formula 2, center frequency $u_0 = (d/\lambda b)$ has been considered. Assuming that $d = 1.2$ mm, $a = 0.3$ mm, $\lambda = 0.5u$ and $b = 60$ mm, then $u_0$ will be 40.1/mm. It is true that there exist secondary or higher order side bands. However since the OTF of a camera lens, for example, considerably deteriorates at such higher order frequency bands, then it will be sufficient for practical purposes to take into consideration only the positive and negative primary frequency bands. Considering the fact that an optical image contains two-dimensional frequency components, the diffraction grating for use in this invention must be a two-dimensional grating. Although the foregoing example has been described in connection with a rectangular grating, any phase grating of any suitable wave type such as a sine wave type may equally be employed.

Three advantages of the frequency sampling method utilizing a phase grating have previously been stated, of which theoretical grounds will be set forth hereinafter. The first advantage of the optical system's having a minimum light attenuation will be apparent when the property of the phase grating is considered. The grounds of the second and third advantages will be seen from Formula (2). It will also be appreciated from Formula (2) that the approximate OTF $\tau_P(u)$ of the phase grating has nothing to do with the aperture ratio of the image forming lens, which is also apparent from the result of calculation of the phase grating's OTF $\tau_p(u)$ with respect to the several aperture ratios of image forming lenses. It is known that with such a phase grating as defined previously, if the aperture ratio of the lens is F = 11, the OTF curve (triangular wave form) of the phase grating scarcely changes, in spite of the fact that only four grating lines enter the aperture. It will clearly be understood from Formula (2) that the phase grating can be located at any spaced position along the optical axis between the image forming lens and the image forming surface. The band pass width of the phase grating filter and the center frequency $u_0$ are expressed respectively as $a/b\lambda$ and $d/b\lambda$, both the phase grating and the image forming surface. It is possible therefore to design a phase grating so that it has a desired band pass width and center frequency $u_0$, provided that the grating coefficients $a$ and $d$ and the distance $b$ are known. Conversely, it is also possible to scan the frequency bands of the optical image to be detected, by making the phase prating travel along the optical axis, which will be described in detail hereinlater.

Figure 6:
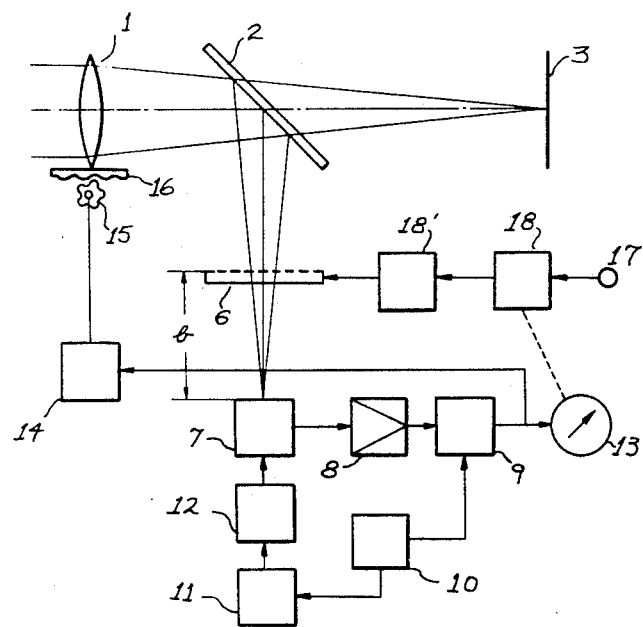
FIG. 6 is a view, partially in block diagram form of an automatic focusing device according to one embodiment of this invention.

Referring now to FIG. 6, an embodiment of the automatic focusing device according to this invention will be described hereinunder.

Figures 7, 8:
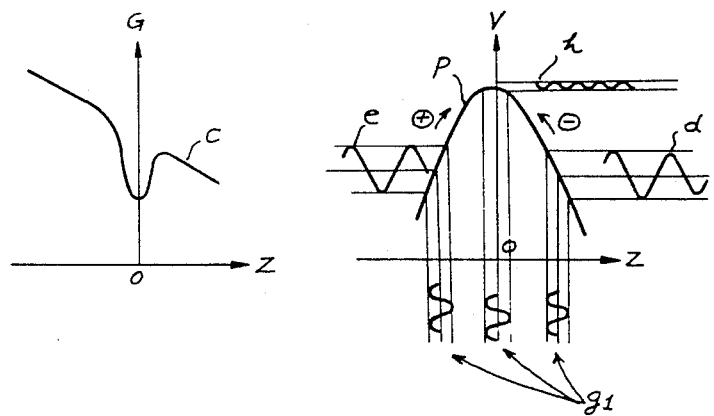
FIG. 7 is a graph representing the dip effect of a light-receiving element.
FIG. 8 is a graph illustrating the variation in the optical image detection voltage V with respect to the defocusing, the graph also representing the principle of the servo-control in accordance with the PSD method described herein.

To the left of a lens 1 (as seen in the Figure) is located an object to be photographed (not shown), of which image is formed on a film surface 3. A portion of the image forming light is reflected by a semitransparent mirror 2 arranged in the optical path between the lens 1 and the image forming surface 3 and forms an image of the object on the light sensitive surface of a light-receiving element 7. A two-dimensional phase grating 6 is arranged transversely in the optical path between the semitransparent mirror 2 and the light-receiving element 7. The frequency component of the optical image to be formed on the light-receiving element 7 is filtered through the two-dimensional phase grating 6 having a band-pass filter effect, resulting in a sudden change in the contrast of the object image with respect to the defocusing as stated previously (FIG. 5). The light-receiving element 7 may be an element having a dip effect, for example a CdS cell. FIG. 7 is a view illustrating the dip effect, wherein the defocusing quantity $z$ is taken as abscissa and the conductance C of the CdS light-receiving element as ordinate. As is seen from this graph conductance curve C has a local minimum value at the focusing point. This phenomenon is dependent on the property of the light-receiving element and already known in this art. The voltage V detected by the light-receiving element 7 varies with the focusing value $z$ as shown by curve P in Fig. 8. The detected voltage V reaches a maximum at the focusing point and curve P resembles curve $C_1$ (Fig. 5) plotting the contrast change ratio. Therefore, with the construction of FIG. 6 the light-receiving element 7 detects the change in the image contrast which is caused by shifting the lens 1 and develops an output voltage. This output voltage is used as a signal for servo-controlling the lens 1, the manner of which will be described with respect to the known phase sensitive detection method (hereinafter referred to as PSD method) which is commonly used in servocontrol system. The light-receiving element 7 is mechanically vibrated in a simple harmonic motion at a constant amplitude and constant period along the optical axis by means of an oscillation device 12. The frequency of this single harmonic motion (for example 100 Hz) is controlled by an oscillator 10 connected to a drive circuit 11. The oscillation device 12 may be an electro-magnetic oscillation device such as a voice coil for use in a loud speaker and may be so arranged as to impart a single harmonic motion to an iron piece fixed to the light-receiving element 7. The construction and operational principle of such an oscillation device 12 are already known in the art. To modulate the image detecting signal, instead of oscillating the light-receiving element 7, the length of the optical path between the phase grating 6 and the light-receiving element 7 may be varied. It may also be possible to modulate the applied voltage by means of an electro-optical crystal such as KDP inserted in the optical path, or to arrange an optical wedge so that it moves single harmonically in a direction perpendicular to the optical axis. These are methods for imparting a single harmonic motion to the optical path length and will be called herein optical path length modulation methods.

The relationship between the defocusing value $z$ and the output signal V from the light-receiving element 7 at the time when the optical path length is modulated in this manner is illustrated in FIG. 8, wherein curve P shows a photoelectric signal actually detected when no optical path length modulation is applied, and corresponding to the variation in the image contrast. FIG. 8 also illustrates the output signal curves obtained when the optical path length modulation having an identical amplitude is applied at the focusing position, a positive defocusing position and a negative defocusing position. The single harmonic motion of the light-receiving element 7 along the optical axis is represented by a sine wave $g_1$; while the output voltage waveform obtained at the focusing position and a positive and negative defocusing positions are shown at curves $h$, $d$ and $e$ respectively. It will be appreciated from these curves that the output voltage is minimum at the focusing position, and the output signals obtained at the positive and negative defocusing positions are out of phase by ' from each other. The PSD method determines the focusing position depending on the output voltage and the phase inversion.

The modulated output signal from the light-receiving element 7 are amplified by an amplifier 8 and the phase thereof with respect to the reference signal from the oscillator 10 is detected by the phase detector 9. Then the signals are converted into a positive or negative direct current, of which value corresponds to the positive or negative defocusing value $z$ (FIG. 6). The output from the phase detector 9 is used to drive a DC servomotor 14, the direction of its rotation being as shown by arrows and (FIG. 8) depending on whether the output from the phase detector 9 be negative or positive and always toward the top of the detected signal curve P, that is, toward the focusing position. On the shaft of the DC servomotor 14 is fixed a pinion 15 which is in engagement with a rack 16 fixedly attached to the lens 1, so that the lens 1 is servo-controlled by the output from the phase detector 9 until it is in an accurate focusing position. Although the invention has been described in connection with a light-receiving element having a dip effect, any other suitable semiconductor light-receiving element such as a phototransistor PIN and photodiode may equally be used.

When no demodulation method is applied, it is generally difficult to determine the focusing position (top of curve P in FIG. 8) only by the DC output signal V developed from the light-receiving element 7, the reason of which will be stated hereinunder. As is seen from FIG. 8 the DC output signal V has an identical value at the positive and negative defocusing positions. It is therefore impossible to determine whether the defocusing is positive or negative on the basis of this output signal alone. To determine the focusing position the voltages detected at any two adjacent defocusing positions must always be compared with each other. The PSD is a well-contrived method which provides for this comparison in a analog and sequential manner, and possibly one of the most preferably methods for determining the accurage focusing position rapidly.

Figure 9:
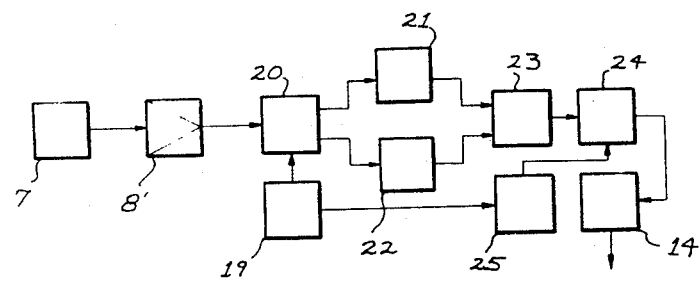
FIG. 9 is a block diagram of an automatic focusing circuit in accordance with the voltage comparison method.
Figure 10:
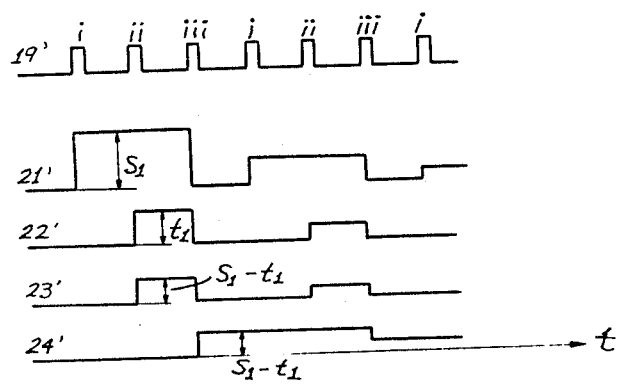
FIG. 10 is a series of time charts showing the operation of various circuits of FIG. 9.

A servo-control method which substitutes the PSD is a voltage comparison method, which is carried out by use of such a circuit system as shown in FIG. 9. With this voltage comparison method, the various circuits required in the PSD method for modulating the optical path length can be eliminated and the voltage to be detected is a DC voltage. Consequently, a DC amplifier is provided as shown at 8' and the output signal therefrom is applied alternately to the subsequent memory circuits 21 and 22. An oscillator 19 is arranged to control the operation of the memory circuits 21 and 22, the control cycle being illustrated in FIG. 11. Pulse trains 19', 21', 22', 23' and 24' represent, respectively, the clock pulses from the oscillator 19, the memory voltages of the memory circuits 21 and 22, the output voltage from the differential amplifier and the motor controlling voltage. These pulse trains are illustrated with respect to the time $t$ taken as abscissa. The set and reset signals to be applied to the memory circuits 21 and 22 are generated repeatedly at 3-clock period intervals (FIG. 11) from a gate 20 which is operated by the pulse i), ii) and iii) from the oscillator 19. The voltages $s_1$ and $t_1$ memorized by these two memory circuits are compared with each other by differential amplifier 23, which in turn produces a difference voltage $s_1-t_1$ (under these circumstances it is assumed that the lens 1 is moving). The difference voltage is applied to a voltage hold circuit 24 at 3-clock period intervals of the clock pulse 19' and held for three clock periods as shown at 24' in FIG. 10. The voltage hold circuit 24 is controlled by the clock pulse applied from the oscillator 19 through the gate 25. In this way the DC servomotor 14 is controlled depending on the the difference voltage and its sign, for thereby servocontrolling the position of the lens 1 until the difference voltage becomes zero.

Unlike the PSD method, the voltage comparison method requires no optical path length modulation circuit nor any oscillation device. It is executed with a simple circuit construction, providing a light-weight, compact automatic focusing device. It is also true, however, that the voltage comparison method provides a less accurate servo-control when compared with the PSD method.

Now the discussion will be directed to another method in which the power spectrum band to be received is varied by shifting the two-dimensional phase grating 6 along the optical axis, or in other words by varying the distance $b$ (FIG. 6). When the two-dimensional phase grating 6 is moved toward the lens 1 (or in the direction to increase $b$) both the center frequency $u_0 = d/b\lambda$ and the band width $B = 2a/b\lambda$ of the power spectrum of the optical image detected by the light-receiving element 7 decrease and the triangular wave representing the power spectrum of the image becomes sharper. One the contrary, when the two-dimensional phase grating 6 is moved toward the light-receiving element 7 the frequency to be selected increases and the resulting traingular wave becomes flat.

The spectrum conponents contained in the object's image formed on the light-receiving element 7 are dependent on the original frequency components contained in the object to be photographed. What is required to the automatic focusing device is that it is finely adjustable to any object having any frequency components. Now it should be assumed in FIG. 6 that the lens 1 is located in an arbitrary defocusing position and the absolute value of the output DC voltage from the phase detector at that time is indicated on a voltmeter 13. Under these circumstances, while monitoring the reading on the voltmeter 13 if the button 17 is depressed, the motor 18 will drive a shifter device 18' consisting of, for example, a rack and pinion mechanism to thereby shift the two-dimensional grating 6 along the optical axis. Consequently the indication on the voltmeter 13 will vary depending on the frequency characteristic of the object to be photographed. The grating position corresponding to the maximum indication on the voltmeter 13 is the optimum position for the automatic focusing. Generally such optimum position varies depending on the individual object to be photographed and can be predetermined experimentally. It will therefore be possible to manually select the optimum frequency of the spectrum to be received with the provision of a scale dial which indicates the optimum grating position for a particular object and a simple mechanism which is arranged in association with said scale dial for shifting the grating.

It is possible to manufacture two-dimensional grating having arbitrary OTF characteristics by use of a photoresist method or evaporation method. These techniques are already known in the art and will not be described herein. In a single-lens reflex camera, the semitransparent mirror 2 of FIG. 6 which is provided for light measurement any be the swingable total relex mirror.

Having decribed hereinabove the automatic focusing device according to this invention, the advantages and features thereof will be summarized as follows:

First, the automatic focusing device of this invention is characterized in that the OTF of the image forming optical system is filtered by a two-dimensional phase grating which is one of the most basic optical elements and acts as an optical band-pass filter. This technical idea cannot be seen in any conventional known automatic focusing devices;

Secondly, the automatic focusing device according to this invention permits a high sensitive control of the focusing position. This owes to the filtering action of the two-dimensional phase grating, which extracts the high frequency components from the image for thereby remarkably increasing the variation in the image contrast resulting from the defocusing;

Thirdly, the automatic focusing device according to this invention is provided with a servo-control system which operates in accordance with the PSD method or voltage comparison method as well as a semiconductor having a dip effect which detects photoelectrically the image contrast. Thus the device of this invention can be made compact and lightweight, so that it can be built into a compact image forming device such as a camera;

Fourthly, thanks to the property of the phase grating and irrespective of the aperture ratio of the image forming lens, an improved image contrast can be obtained without reducing the light quantity of the optical image;

Fifthly, the use of a two-dimensional grating permits a two-dimensional simultaneous detection of the image contrast; and Lastly, a precies automatic focusing can be achieved for each object to the photographed by selecting the optimum position of the phase grating for the object.

The invention has been described in connection with the phase grating. However, it is theoretically apparent that the foregoing advantages and features of this invention could be achieved by use of a diffraction grating of other types such as an amplitude grating or complex amplitude grating. In this event, however, the image contrast could be improved only by reducing the light quantity of the optical image. This is the inevitable disadvantage of the amplitude grating.

With these numerous advantages inncorporated therein, the automatic focusing device according to this invention has a wide application not only in ordinary cameras but also in the moving picture cameras and other image forming opical apparatus.

What is claimed is:

1. Automatic focusing apparatus comprising:

first means, including a lens, defining an optical path such that at least a portion of light passing through the lens impinges upon a plane, the lens and the plane being movable relative to each other in either of two opposite directions along the optical path, second means, including a photoelectic element responsive to the light impinging upon the plane, for producing an electrical focusing control signal that varies in accordance with the degree of contrast in the light impinging upon the plane, the degree of contrast being maximum for an in-focus spacing between the lens and the plane, an optical transmission function filter for increasing the difference between the degree of contrast obtained at an in-focus spacing and the degree of contrast obtained at an out-of-focus spacing, the filter comprising a two-dimensional diffraction grating disposed in the optical path and spaced from both the lens and the plane, and third means responsive to the electrical focusing control signal for adjusting the spacing between the lens and the plane to a relative position that maximizes the degree of contrast.

2. Apparatus according to claim 1 wherein the third means includes a motor mechanically coupled to move the lens and electrically coupled to respond to the electrical focusing control signal.

3. Apparatus according to claim 2 further including oscillating means for cyclically varying the optical path length between the two-dimensional diffraction grating and the plane whereby the control signal has a carrier frequency having opposite phases on opposite sides of the in-focus position, and wherein the third means includes a phase detector circuit responsive to the control sequel and the oscillating means for producing a signal for controlling the motor.

4. Apparatus according to claim 3 further comprising means for shifting the two-dimensional diffraction grating in either of two opposite directions relative to the plane, an electrically controlled indicator and circuit means coupling the electrical control signal to the indicator so as to provide a display indicating whether the spacing between the grating and the plane provides the optimum relative spacing for automatic focusing.

5. Apparatus according to claim 2 wherein the third means includes a pair of memory circuits, circuit means coupling the electrical focusing control signal to alternate ones of the memory circuits and comparison means responsive to the memory circuits for producing a signal for controlling the motor.

6. Apparatus according to claim 5 further comprising means for shifting the two-dimensional diffraction grating in either of two opposite directions relative to the plane, an electrically controlled indicator, and circuit means coupling the electrical control signal to the indicator so as to provide a display indicating whether the spacing between the grating and the plane provides the optimum relative spacing for automatic focusing.

* * * * *